US012382216B2

(12) United States Patent
Wu et al.

(10) Patent No.: US 12,382,216 B2
(45) Date of Patent: Aug. 5, 2025

(54) EMBEDDED DAMPER SPEAKER DESIGN

(71) Applicant: DELL PRODUCTS L.P., Round Rock, TX (US)

(72) Inventors: Jing-Tang Wu, New Taipei (TW); Bo-Wei Chu, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 18/302,894

(22) Filed: Apr. 19, 2023

(65) Prior Publication Data

US 2024/0357281 A1 Oct. 24, 2024

(51) Int. Cl.
*H04R 1/28* (2006.01)
*H04R 1/02* (2006.01)

(52) U.S. Cl.
CPC ............... *H04R 1/288* (2013.01); *H04R 1/02* (2013.01); *H04R 2499/11* (2013.01)

(58) Field of Classification Search
CPC .......... H04R 1/02; H04R 1/025; H04R 1/026; H04R 1/28; H04R 1/2807; H04R 1/2869; H04R 1/2884; H04R 1/288; H04R 2499/11; H04R 2499/15
See application file for complete search history.

(56) References Cited

U.S. PATENT DOCUMENTS 6,415,036 B1 * 7/2002 Ritter .................... H04N 5/642 381/189
6,760,460 B1 * 7/2004 Jeon ...................... H04N 5/642 381/388
6,925,188 B1 * 8/2005 Markow .............. G06F 1/1616 381/388
6,990,212 B2 * 1/2006 Kambe .................... H04R 1/02 381/387
7,184,566 B2 * 2/2007 Tamura .................. H04N 5/642 381/333
7,817,813 B2 * 10/2010 Kang ..................... H04R 1/288 381/388
7,894,182 B2 * 2/2011 Wang .................... G06F 1/1605 349/56
8,325,937 B2 12/2012 Kuriakose
8,538,046 B2 * 9/2013 Chen ........................ H04R 5/02 381/182
8,660,291 B2 * 2/2014 Wang ..................... H04R 1/025 381/386
10,694,283 B2 * 6/2020 Haastrup ................. H04M 1/19
10,827,243 B1 11/2020 Peana et al.
10,945,066 B2 * 3/2021 Han ........................ H04R 1/28
(Continued)

FOREIGN PATENT DOCUMENTS

CN 107040830 A * 8/2017
CN 110809204 A * 2/2020 .............. H04R 1/02
(Continued)

*Primary Examiner* — Edgardo San Martin
(74) *Attorney, Agent, or Firm* — Larson Newman, LLP

(57) ABSTRACT

An embedded-damper speaker for an information handling system includes a top speaker housing, a bottom speaker housing, and a damper. The bottom speaker housing is in physical communication with the top speaker housing. The damper is secured in between the top and bottom speaker housings. The damper reduces acoustic resonance between the embedded-damper speaker and the information handling system.

20 Claims, 6 Drawing Sheets

(56) References Cited

U.S. PATENT DOCUMENTS

| | | | | | |
|---|---|---|---|---|---|
| 10,999,663 | B2 * | 5/2021 | Xu | H04N 5/642 | |
| 2009/0242322 | A1 * | 10/2009 | Tsai | F16F 1/373 | 181/207 |
| 2019/0149910 | A1 * | 5/2019 | Lee | G10K 11/002 | 381/386 |
| 2023/0370768 | A1 * | 11/2023 | Kimura | H04R 1/026 | |
| 2025/0048023 | A1 * | 2/2025 | Pan | H04R 1/025 | |

FOREIGN PATENT DOCUMENTS

| | | | | |
|---|---|---|---|---|
| CN | 117440275 | A | * | 1/2024 |
| CN | 221598124 | U | * | 8/2024 |
| JP | S61166680 | U | * | 10/1986 |
| JP | 2000224681 | A | * | 8/2000 |
| KR | 20100081178 | A | * | 7/2010 |
| WO | WO-2021025334 | A1 | * | 2/2021 |

* cited by examiner

EMBEDDED DAMPER SPEAKER DESIGN

FIELD OF THE DISCLOSURE

The present disclosure generally relates to information handling systems, and more particularly relates to an embedded damper speaker design.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs, and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An embedded-damper speaker for an information handling system includes a top speaker housing, a bottom speaker housing, and a damper. The bottom speaker housing may be physical communication with the top speaker housing. The damper may be secured between the top and bottom speaker housings. The damper may reduce acoustic resonance between the embedded-damper speaker and the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
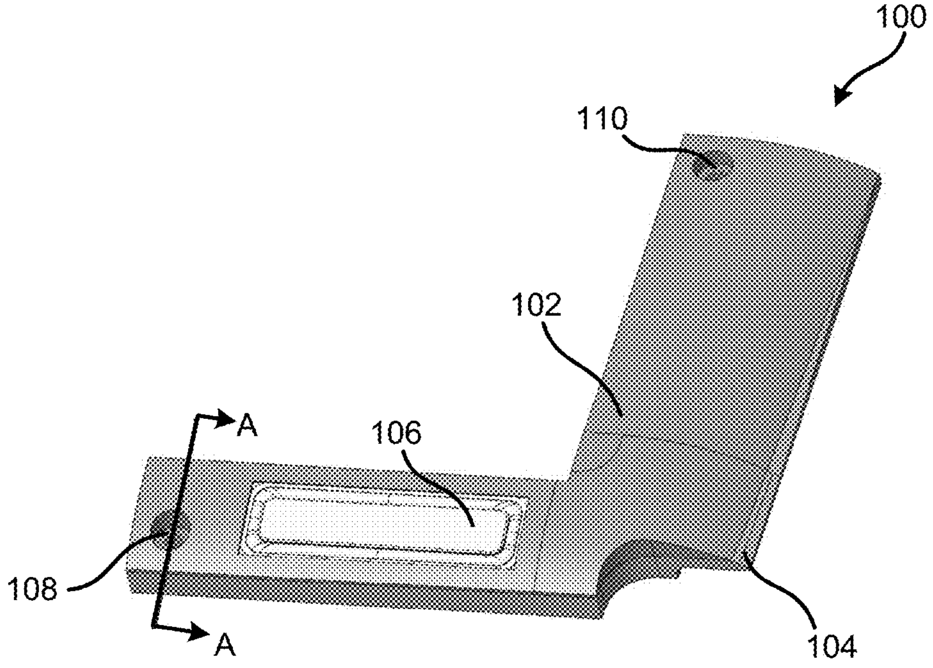
FIG. 1 is a perspective view of an embedded damper speaker for an information handling system according to at least one embodiment of the present disclosure.
Figure 2:
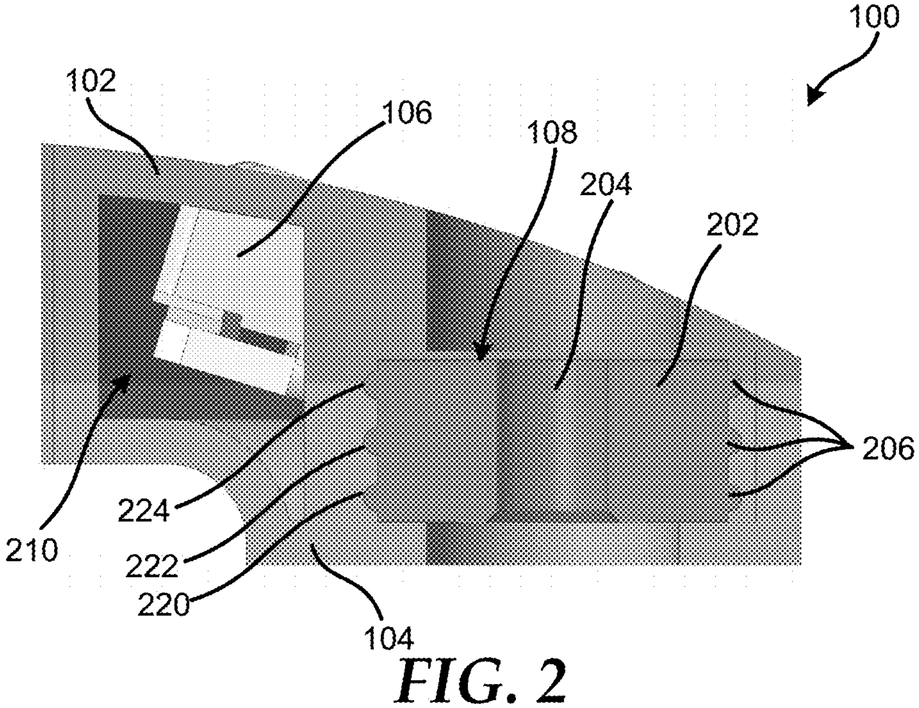
FIG. 2 is a cross sectional view of the embedded damper speaker taken along line A-A in FIG. 1 and according to at least one embodiment of the present disclosure.
Figure 3:
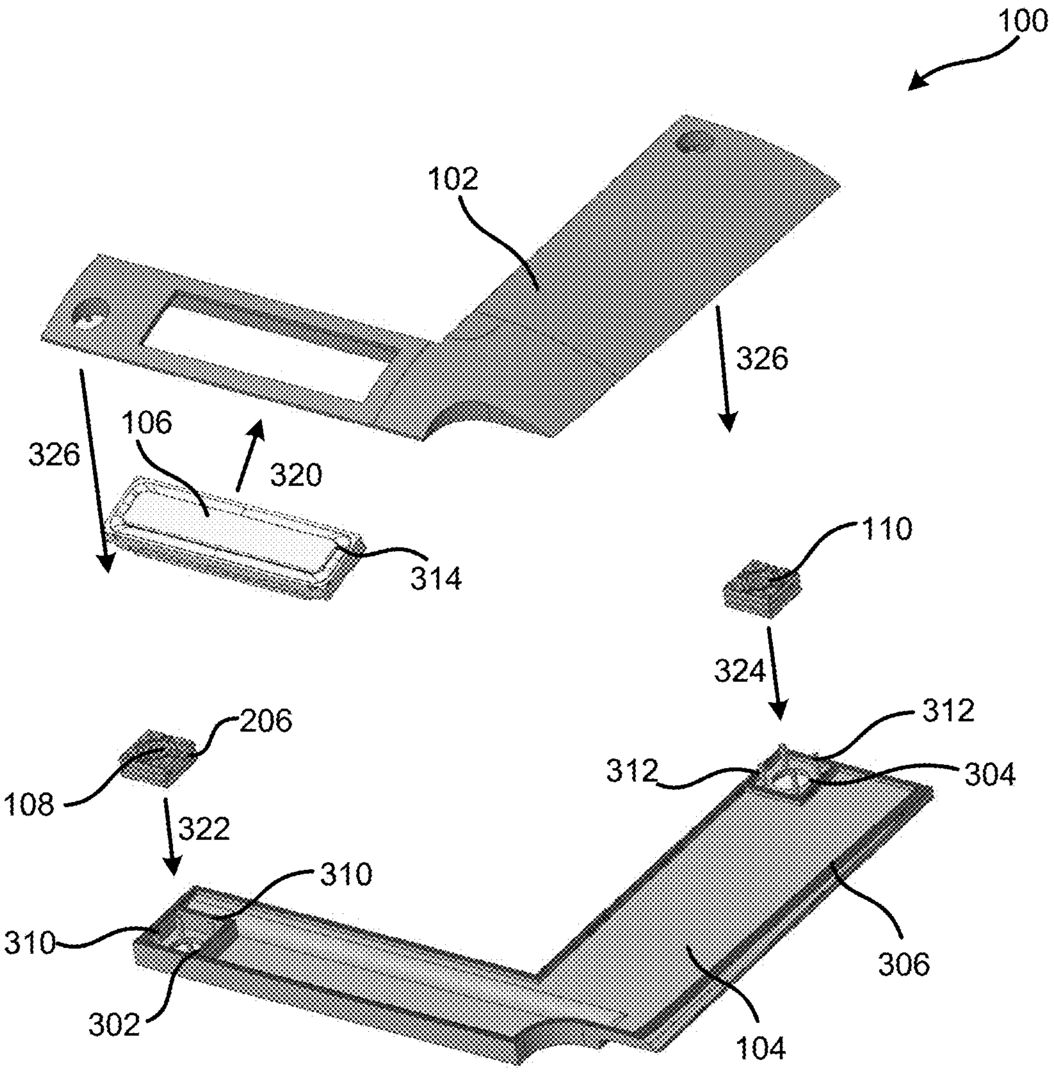
FIG. 3 is an exploded perspective view of the embedded damper speaker according to at least one embodiment of the present disclosure.
Figure 4:
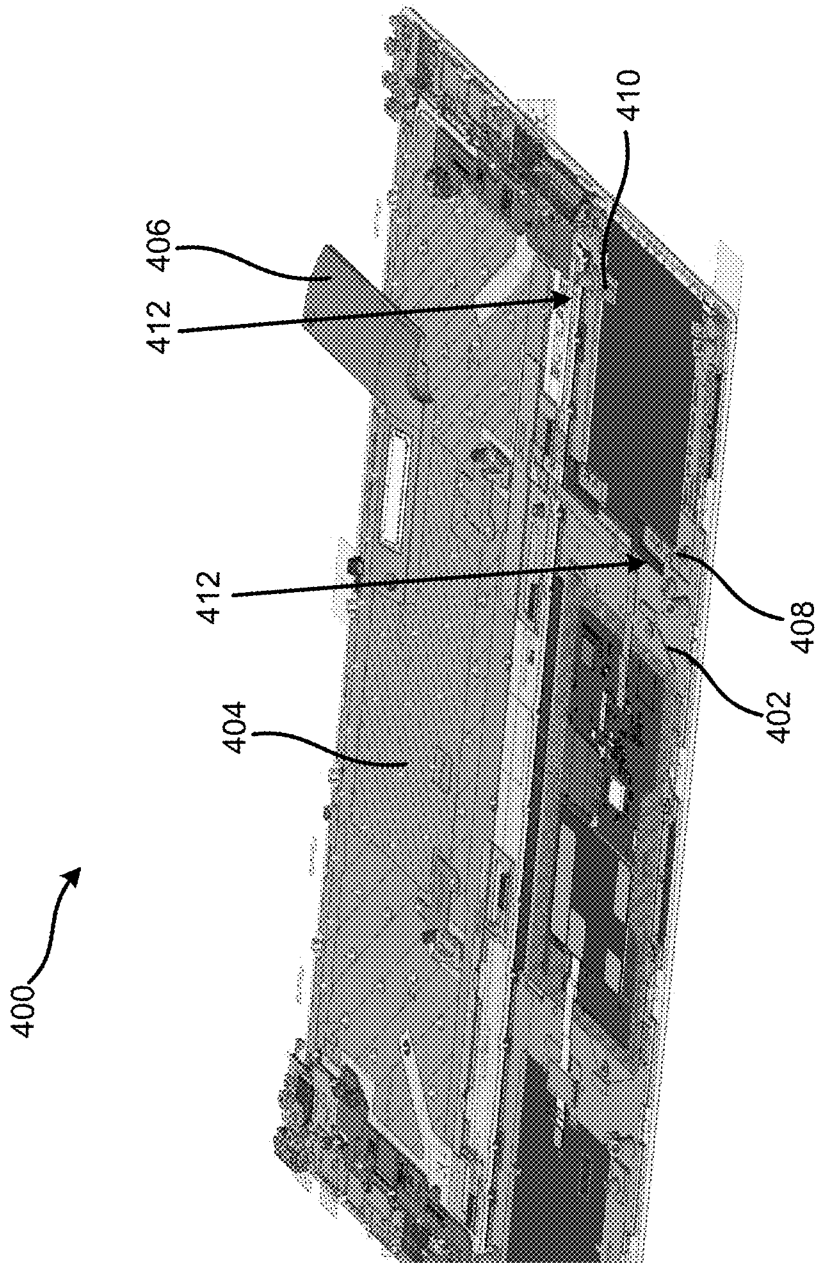
FIG. 4 is a perspective view of a portion of an information handling system according to at least one embodiment of the present disclosure.
Figure 9:
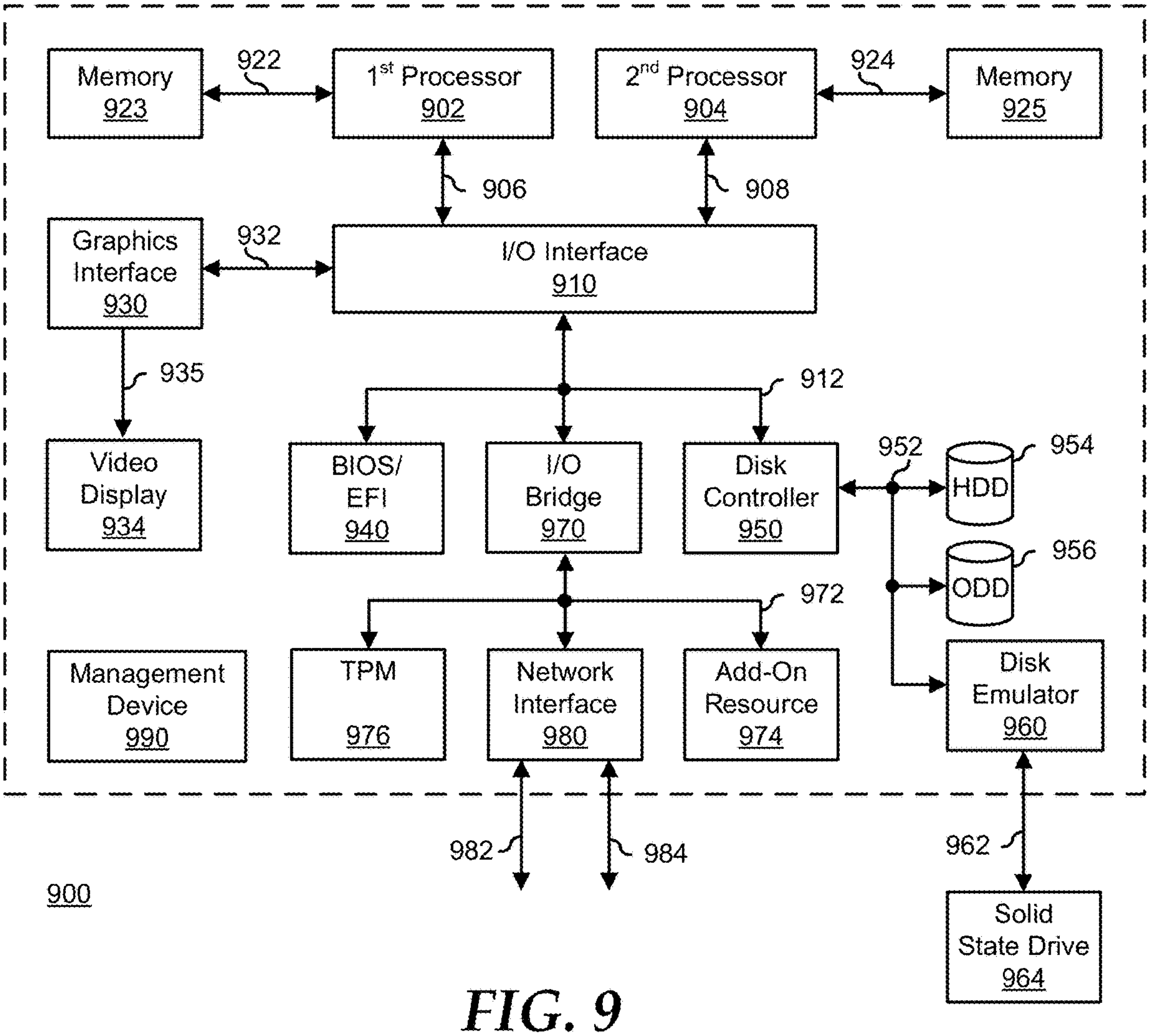
FIG. 9 is a block diagram of a general information handling system according to an embodiment of the present disclosure.

FIGS. 1-3 illustrate an embedded-damper speaker 100 for an information handling system, such as information handling system 900 of FIG. 9, according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), blade server or rack server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Embedded-damper speaker 100 includes an upper speaker housing 102, a lower speaker housing 104, a transducer 106, and dampers 108 and 110. In an example, transducer 106 may be located between upper speaker housing 102 and lower speaker housing 104. Similarly, dampers 108 and 110 may be located between upper speaker housing 102 and lower speaker housing 104. In an example, transducer 106 may provide sound waves based on the electrical signals received by embedded-damper speaker 100. Dampers 108 and 110 may be utilized to reduce acoustic resonance within an information handling system that includes embedded-damper speaker 100. In an example, top speaker housing 102 and bottom speaker housing 104 join to form a complete speaker housing, which dampers 108 and 110 may be embedded within. While only two dampers 108 and 110 have been illustrated, embedded-damper speaker 100 may include any suitable number of additional dampers without varying from the scope of this disclosure.

Previous speaker modules with dampers had a potential risk that the dampers may pop out during assembly/disassembly of the speaker module within the information handling system. The failure in the previous speaker modules may have resulted from the damper being made from a cushion material, such as silicon rubber, and this material may be compressible, which in turn may cause the damper to pop out of the speaker module in Z orientation. The damper may pop out of the speaker module for any suitable reason including, but not limited to, the elastic damper not being assembled well with speaker module, and the elastic damper being easy to pop when assembled in the information handling system. The damper may pop out because the damper may easily deform when an outer force is applied to the damper during assembly/disassembly. Embedded damper speaker 100 may be improved by dampers 108 and 110 being able to conform to top and bottom speaker housings 102 and 104, and to not pop out of the embedded damper speaker when assembled with an information handling system.

FIG. 2 shows the embedded-damper speaker 100. Damper 108 includes a main portion 202, which in turn includes a hole 204 and multiple ribs 206. As shown in FIG. 2, a top portion of transducer 106 is disposed within top speaker housing 102 and a bottom portion of the transducer is located within a gap 210 formed between the top speaker housing and bottom speaker housing 104. In an example, ribs 206 may extend around every edge of damper 108 as shown in FIG. 3. In certain examples, damper 108 may snap fit within bottom speaker housing 104. For example, each rib 206 of damper 108 may snap fit within a different one of notches 220, 222, and 224 of bottom speaker housing 104. In an example, notch 224 may be formed by a combination of top speaker housing 102 and bottom speaker housing 104. In this example, damper 108 may be secured between top and bottom speaker housings 102 and 104.

Referring now to FIG. 3, bottom speaker housing 104 includes damper interface locations 302 and 304, and a sealant material 306. In an example, sealant material 306 may be located around an output edge of bottom speaker housing 104. Damper interface location 302 includes multiple rod structures 310, and damper interface location 304 includes multiple rod structures 312. Transducer 106 includes a sealant material 314 around an outer edge of the transducer. In an example, sealant materials 306 and 314 may be any suitable sealant, such as a glue, to seal and secure transducer 106 to top housing 102 and seal and secure the top housing to bottom housing 104.

In certain examples, embedded-damper speaker 100 may be assembled in any suitable manner to embed dampers 108 and 110 within the complete housing of the speaker. For example, transducer 106 may be inserted into an opening of top speaker housing 102 in the direction of arrow 320. Based on transducer 106 being inserted, the transducer may be securely mounted in physical communication with top speaker housing 102 via sealant material 314. Damper 108 may be inserted within damper interface location 302 in the direction of arrow 322, and damper 110 may be inserted within damper interface location 304 in the direction of arrow 324.

In an example, when damper 108 is inserted within damper interface location 302, rod structures 310 may be inserted within the damper. Similarly, when damper 110 is inserted within damper interface location 304, rod structures 312 may be inserted within the damper. In certain examples, rod structures 310 may prevent damper 108 peeling off when an outer force is applied on the damper. In an example, top speaker housing 102 may be connected to bottom speaker housing 104 in the direction of arrows 326. Top speaker housing 102 may be secured to bottom speaker housing 104 via sealant material 306. While dampers 108 and 110 are illustrated as square in shape, the dampers may be any suitable shape, such as circular, spherical, rectangular, or the like without varying from the scope of this disclosure.

Figure 5:
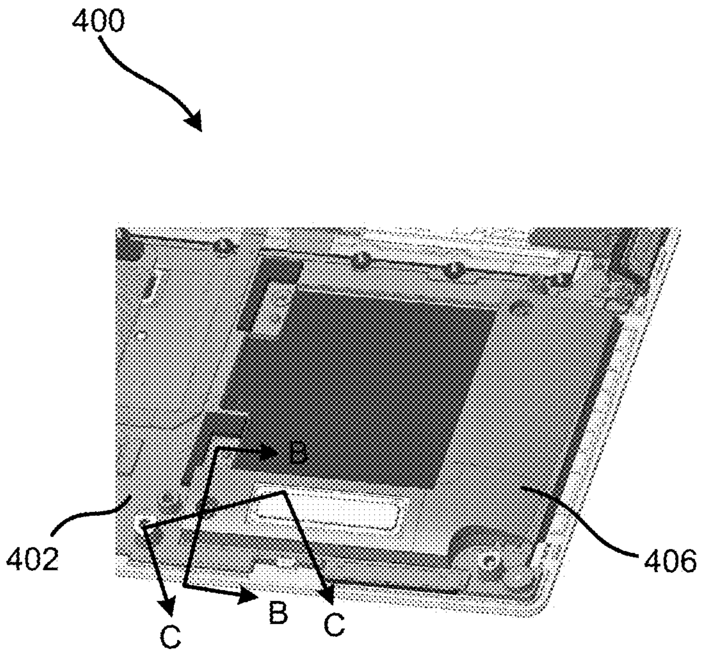
FIG. 5 is a perspective view of a portion of an information handling system according to at least one embodiment of the present disclosure.

FIGS. 4-7 illustrate a portion of an information handling system 400 according to at least one embodiment of the present disclosure. Information handling system 400 includes a cover 402, a palmrest 404, an embedded-damper speaker 406, and hooks 408 and 410. In an example, cover 402 may be any suitable cover, such as a c-cover. In certain examples, hooks 408 and 410 may be utilized to secure embedded-damper speaker 406 to cover 402 of information handling system 400. Embedded-damper speaker 406 may be connected to hooks 408 and 410 by moving the speaker in the direction of arrows 412. Based on the movement in the direction of arrows 412, embedded-damper speaker 406 may be secured to cover 402 as illustrated in FIG. 5.

Figure 6:
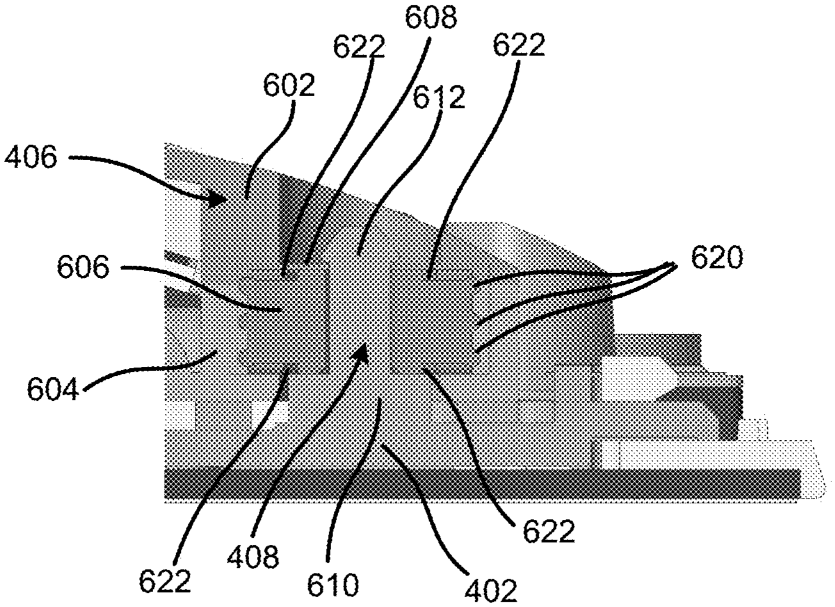
FIG. 6 is a cross sectional view of the embedded damper speaker according to at least one embodiment of the present disclosure.

FIG. 6 illustrates a cross section of embedded-damper speaker 406 and cover 402 in the direction of arrow B-B of FIG. 5. As illustrated in FIG. 6, embedded-damper speaker 406 includes a top speaker housing 602, a bottom speaker housing 604, and a damper 606. Top speaker housing 602 includes a cap 608. Hook 408 includes a base portion 610 and a top portion 612. Damper 606 includes ribs 620 and multiple gaps 622. In an example, hook 408 may be inserted through a hole, such as a hook hole 802 in FIG. 8, of damper 606. In response to hook 408 being inserted through damper 606, top portion 612 of the hook may snap fit with cap 608 of top speaker housing 602.

When top portion 612 is snap fitted on cap 608 of top speaker housing 602, base portion 612 of hook 408 may be in physical communication with damper 606. In an example, gaps 622 may provide a separation of a portion of damper 606 from top and bottom speaker housings 602 and 604. In this example, gaps 622 may create a floating design of damper 606, and the floating design may reduce vibration transmissions from a transducer, such as transducer 106 of FIGS. 1-3, to cover 402. In an example, the reduction of vibration transmissions may effectively prevent vibration in information handling system 400. In an example, bottom speaker housing 604 and cap 608 of top speaker housing 602 may isolate damper 606 from speaker volume of embedded-damper speaker 406. The isolation enables a sealed space for the speaker volume of speaker 406.

Figure 7:
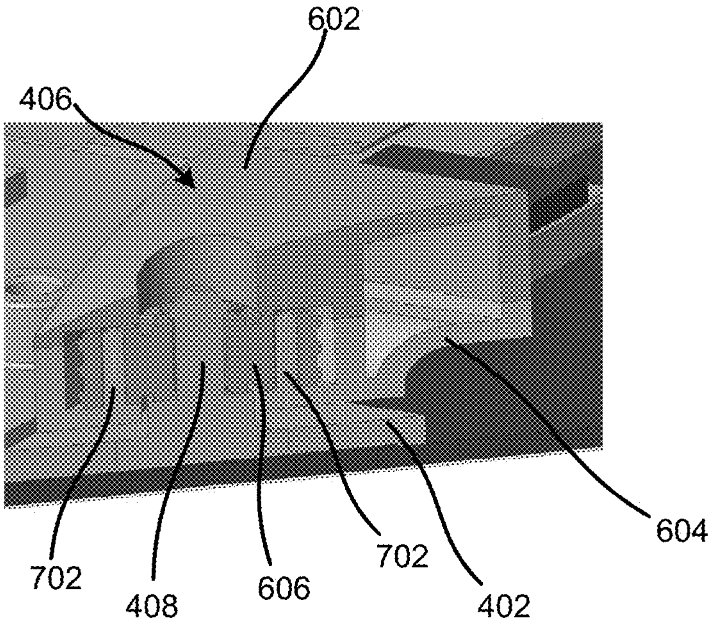
FIG. 7 is another cross sectional view of the embedded damper speaker according to at least one embodiment of the present disclosure.
Figure 8:
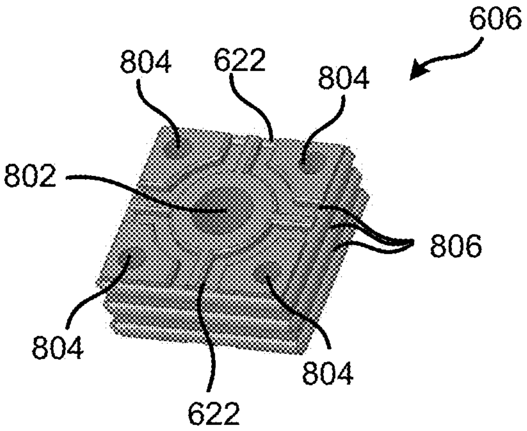
FIG. 8 is a perspective view of a damper according to at least one embodiment of the present disclosure.

FIG. 7 illustrates a cross section of embedded-damper speaker 406 and cover 402 in the direction of arrow C-C of FIG. 5. As illustrated in FIG. 7, bottom speaker housing 604 includes rod structures 702. In an example, rod structures 702 may be inserted with holes of damper 606, such as rod holes 804 illustrated in FIG. 8. In certain examples, rod structures 702 may be inserted within damper 606 in substantially the same manner as described above with respect to FIG. 3. Rod structures 702 may prevent damper 606 from peeling off of bottom speaker housing 604 when hook 408 is inserted and removed from the damper. While FIGS. 6 and 7 have been described with respect to only a single damper 606, one of ordinary skill in the art would recognize that the interface between damper 606 and hook 408 may be substantially similar in an suitable number of dampers and hooks without varying from the scope of this disclosure. While damper 606 is illustrated in FIG. 8 as square in shape, the damper may be any suitable shape, such as circular, spherical, rectangular, or the like without varying from the scope of this disclosure.

FIG. 9 shows a generalized embodiment of an information handling system 900 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 900 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 900 can include processing resources for executing machine-executable code, such as a central processing unit (CPU), a programmable logic array (PLA), an embedded device such as a System-on-a-Chip (SoC), or other control logic hardware. Information handling system 900 can also include one or more computer-readable medium for storing machine-executable code, such as software or data. Additional components of information handling system 900 can include one or more storage devices that can store machine-executable code, one or more communications ports for communicating with external devices, and various input and output (I/O) devices, such as a keyboard, a mouse, and a video display. Information handling system 900 can also include one or more buses operable to transmit information between the various hardware components.

Information handling system 900 can include devices or modules that embody one or more of the devices or modules described below and operates to perform one or more of the methods described below. Information handling system 900 includes a processors 902 and 904, an input/output (I/O) interface 910, memories 920 and 925, a graphics interface 930, a basic input and output system/universal extensible firmware interface (BIOS/UEFI) module 940, a disk controller 950, a hard disk drive (HDD) 954, an optical disk drive (ODD) 956, a disk emulator 960 connected to an external solid state drive (SSD) 962, an I/O bridge 970, one or more add-on resources 974, a trusted platform module (TPM) 976, a network interface 980, a management device 990, and a power supply 995. Processors 902 and 904, I/O interface 910, memory 920, graphics interface 930, BIOS/UEFI module 940, disk controller 950, HDD 954, ODD 956, disk emulator 960, SSD 962, I/O bridge 970, add-on resources 974, TPM 976, and network interface 980 operate together to provide a host environment of information handling system 900 that operates to provide the data processing functionality of the information handling system. The host environment operates to execute machine-executable code, including platform BIOS/UEFI code, device firmware, operating system code, applications, programs, and the like, to perform the data processing tasks associated with information handling system 900.

In the host environment, processor 902 is connected to I/O interface 910 via processor interface 906, and processor 904 is connected to the I/O interface via processor interface 908. Memory 920 is connected to processor 902 via a memory interface 922. Memory 925 is connected to processor 904 via a memory interface 927. Graphics interface 930 is connected to I/O interface 910 via a graphics interface 932 and provides a video display output 936 to a video display 934. In a particular embodiment, information handling system 900 includes separate memories that are dedicated to each of processors 902 and 904 via separate memory interfaces. An example of memories 920 and 930 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 940, disk controller 950, and I/O bridge 970 are connected to I/O interface 910 via an I/O channel 912. An example of I/O channel 912 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 910 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 940 includes BIOS/UEFI code operable to detect resources within information handling system 900, to provide drivers for the resources, initialize the resources, and access the resources. BIOS/UEFI module 940 includes code that operates to detect resources within information handling system 900, to provide drivers for the resources, to initialize the resources, and to access the resources.

Disk controller 950 includes a disk interface 952 that connects the disk controller to HDD 954, to ODD 956, and to disk emulator 960. An example of disk interface 952 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 960 permits SSD 964 to be connected to information handling system 900 via an external interface 962. An example of external interface 962 includes a USB interface, an IEEE 3394 (Firewire) interface, a proprietary interface, or a combination thereof. Alternatively, solid-state drive 964 can be disposed within information handling system 900.

I/O bridge 970 includes a peripheral interface 972 that connects the I/O bridge to add-on resource 974, to TPM 976, and to network interface 980. Peripheral interface 972 can be the same type of interface as I/O channel 912 or can be a different type of interface. As such, I/O bridge 970 extends the capacity of I/O channel 912 when peripheral interface 972 and the I/O channel are of the same type, and the I/O bridge translates information from a format suitable to the I/O channel to a format suitable to the peripheral channel 972 when they are of a different type. Add-on resource 974 can include a data storage system, an additional graphics interface, a network interface card (NIC), a sound/video processing card, another add-on resource, or a combination thereof. Add-on resource 974 can be on a main circuit board, on separate circuit board or add-in card disposed within information handling system 900, a device that is external to the information handling system, or a combination thereof.

Network interface 980 represents a NIC disposed within information handling system 900, on a main circuit board of the information handling system, integrated onto another component such as I/O interface 910, in another suitable location, or a combination thereof. Network interface device 980 includes network channels 982 and 984 that provide interfaces to devices that are external to information handling system 900. In a particular embodiment, network channels 982 and 984 are of a different type than peripheral channel 972 and network interface 980 translates information from a format suitable to the peripheral channel to a format suitable to external devices. An example of network channels 982 and 984 includes InfiniBand channels, Fibre Channel channels, Gigabit Ethernet channels, proprietary channel architectures, or a combination thereof. Network channels 982 and 984 can be connected to external network resources (not illustrated). The network resource can include another information handling system, a data storage system, another network, a grid management system, another suitable resource, or a combination thereof.

Management device 990 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 900. In particular, management device 990 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 900, such as system cooling fans and power supplies. Management device 990 can include a network connection to an external management system, and the management device can communicate with the management system to report status information for information handling system 900, to receive BIOS/UEFI or system firmware updates, or to perform other task for managing and controlling the operation of information handling system 900.

Management device 990 can operate off of a separate power plane from the components of the host environment so that the management device receives power to manage information handling system 900 when the information handling system is otherwise shut down. An example of management device 990 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 990 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. An embedded-damper speaker for an information handling system, the embedded-damper speaker comprising:
a top speaker housing;
a bottom speaker housing in physical communication with the top speaker housing;
a damper secured between the top and bottom speaker housings, the damper to reduce acoustic resonance between the embedded-damper speaker and the information handling system; and
a plurality of notches, wherein a first subset of the plurality of notches is located within the bottom speaker housing and a second notch is formed between the top speaker housing and the bottom speaker housing, wherein the damper is in physical communication with the notches, wherein the second notch secures the second damper between the top and bottom speaker housings.

2. The embedded-damper speaker of claim 1, wherein the bottom speaker housing includes a plurality of rods inserted through the damper, wherein the rods provide support to the damper to hold the damper in position when a force is applied to the damper.

3. The embedded-damper speaker of claim 1, further comprising: a plurality of notches in the bottom speaker housing, wherein the damper is in physical communication with the notches.

4. The embedded-damper speaker of claim 3, wherein the damper includes a plurality of ribs, wherein each of the ribs are located within a different one of the notches.

5. The embedded-damper speaker of claim 4, wherein a first notch of the notches is formed from an intersection of the top speaker housing and the bottom speaker housing.

6. The embedded-damper speaker of claim 5, the damper is secured in between the top housing and the bottom housing based on a first rib of the ribs being located within the first notch.

7. The embedded-damper speaker of claim 1, further comprising a transducer secured in physical communication with the top speaker housing.

8. The embedded-damper speaker of claim 1, wherein the damper is a point of physical communication between the embedded-damper speaker and the information handling system.

9. An information handling system comprising:
a cover;
first and second hooks in physical communication with the cover; and
an embedded-damper speaker in physical communication with the first and second hooks, the embedded-damper speaker including:
a top speaker housing;

a bottom speaker housing in physical communication with the top speaker housing;

a first damper secured between the top and bottom speaker housings and in physical communication with the first hook;

a second damper secured in between the top and bottom speaker housings and in physical communication with the second hook, the first and second dampers to reduce acoustic resonance between the embedded-damper speaker and the cover; and a plurality of notches, wherein a first subset of the plurality of notches is located within the bottom speaker housing and a second notch is formed between the top speaker housing and the bottom speaker housing, wherein the damper is in physical communication with the notches, wherein the second notch secures the second damper between the top and bottom speaker housings.

10. The information handling system of claim 9, wherein the bottom speaker housing includes a plurality of rods inserted through the first damper, wherein the rods provide support to the first damper to hold the first damper in position when a force is applied to the first damper by the first hook.

11. The information handling system of claim 9, wherein the embedded-damper speaker further comprises: a plurality of notches, wherein the first damper is in physical communication with the notches.

12. The information handling system of claim 11, wherein the first damper includes a plurality of ribs, wherein each of the ribs are located within a different one of the notches.

13. The information handling system of claim 12, wherein a first notch of the notches is formed from an intersection of the top speaker housing and the bottom speaker housing.

14. The information handling system of claim 13, the damper is secured in between the top housing and the bottom housing based on a first rib of the ribs being located within the first notch.

15. The information handling system of claim 9, wherein the embedded-damper speaker further comprising: a transducer secured in physical communication with the top speaker housing.

16. The information handling system of claim 9, wherein the first damper and the first hook create a point of physical communication between the embedded-damper speaker and the cover.

17. An information handling system comprising:

a cover;

first and second hooks in physical communication with the cover; and an embedded-damper speaker in physical communication with the first and second hooks, the embedded-damper speaker including:

a top speaker housing;

a transducer secured in physical communication with the top speaker housing;

a bottom speaker housing in physical communication with the top speaker housing, the bottom speaker housing including a plurality of rods;

a first damper secured in between the top and bottom speaker housings and in physical communication with the first hook, the first damper includes:

a first gap located between the first damper and the top speaker housing, wherein the first gap provides a first separation of a first portion of the first damper and the top speaker housing; and a second gap located between the first damper and the bottom speaker housing, wherein the second gap provides a second separation of a second portion of the first damper and the bottom speaker housing, wherein the first and second gaps create a floating design of the first damper, wherein the rods are inserted through the first damper, wherein the rods provide support to the first damper to hold the first damper in position when a force is applied to the first damper by the first hook; and a second damper secured disposed between the top and bottom speaker housings and in physical communication with the second hook, the first and second dampers to reduce acoustic resonance between the embedded-damper speaker and the cover.

18. The information handling system of claim 17, wherein the embedded-damper speaker further comprises: a plurality of notches, wherein the first damper is in physical communication with the notches.

19. The information handling system of claim 18, wherein the first damper includes a plurality of ribs, wherein each of the ribs are located within a different one of the notches.

20. The information handling system of claim 19, wherein a first notch of the notches is formed from an intersection of the top speaker housing and the bottom speaker housing.

* * * * *